(12) United States Patent
Guiles

(10) Patent No.: US 6,896,314 B2
(45) Date of Patent: May 24, 2005

(54) LOW-PROFILE HIGH-STRENGTH VEHICLE DOOR BEAM

(75) Inventor: Melvin J. Guiles, West Olive, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/945,592

(22) Filed: Sep. 21, 2004

(65) Prior Publication Data

US 2005/0035625 A1 Feb. 17, 2005

Related U.S. Application Data

(63) Continuation of application No. 10/402,462, filed on Mar. 28, 2003, now abandoned.

(51) Int. Cl.$^7$ .................................................. B60J 5/00
(52) U.S. Cl. ..................................... 296/146.6; 293/120
(58) Field of Search .......................... 296/146.6, 187.12, 296/190.03, 146.5, 146.4, 202, 193.05

(56) References Cited

U.S. PATENT DOCUMENTS

| | | | |
|---|---|---|---|
| 4,090,734 A | | 5/1978 | Inami et al. |
| 4,307,911 A | | 12/1981 | Pavlik |
| 4,684,166 A | | 8/1987 | Kanodia |
| 4,796,946 A | | 1/1989 | Wilson et al. |
| 5,080,427 A | * | 1/1992 | Sturrus et al. ............ 296/146.6 |
| 5,232,261 A | | 8/1993 | Kuroda et al. |
| 5,277,470 A | | 1/1994 | Freeman et al. |
| 5,404,690 A | | 4/1995 | Hanf |
| 5,466,032 A | | 11/1995 | Clausen et al. .......... 296/146.6 |
| 5,527,082 A | | 6/1996 | Topker et al. ............ 296/146.6 |
| 5,580,120 A | * | 12/1996 | Nees et al. ............... 296/146.6 |
| 5,600,931 A | * | 2/1997 | Jonsson ................... 296/146.6 |
| 5,692,797 A | | 12/1997 | Dancasiu |
| 5,727,826 A | | 3/1998 | Frank et al. .............. 296/146.6 |
| 5,755,484 A | * | 5/1998 | Chou et al. ............... 296/146.6 |
| 5,756,167 A | * | 5/1998 | Tamura et al. ........... 296/146.6 |
| 5,785,376 A | * | 7/1998 | Nees et al. ............... 296/146.6 |
| 5,813,718 A | * | 9/1998 | Masuda et al. .......... 296/146.6 |
| 5,887,938 A | * | 3/1999 | Topker et al. ............ 296/146.6 |
| 5,926,930 A | | 7/1999 | Tamura et al. |
| 5,934,544 A | * | 8/1999 | Lee et al. .................... 228/146 |
| 5,987,821 A | | 11/1999 | Heim et al. ............... 296/146.5 |
| 5,992,922 A | | 11/1999 | Harbig et al. |
| 6,003,912 A | | 12/1999 | Schonhoff et al. .......... 293/122 |
| 6,065,797 A | | 5/2000 | Shirasaka ................ 296/146.6 |
| 6,096,403 A | | 8/2000 | Wycech |
| 6,141,935 A | | 11/2000 | Artner et al. |
| 6,145,271 A | | 11/2000 | Kossmeier et al. ...... 296/146.6 |
| 6,227,609 B1 | | 5/2001 | Mellis ...................... 296/146.6 |
| 6,240,820 B1 | * | 6/2001 | Sturrus et al. ................. 83/188 |
| 6,290,282 B1 | | 9/2001 | Hortlund et al. |
| 6,332,302 B1 | * | 12/2001 | Asai ......................... 296/146.6 |
| 6,416,114 B1 | * | 7/2002 | Topker et al. ............ 296/146.6 |

(Continued)

FOREIGN PATENT DOCUMENTS

| | | |
|---|---|---|
| DE | 9200388 | 4/1992 |
| DE | 42 24 303 | 1/1994 |
| EP | 0577235 | * 6/1993 |
| EP | 0 577 235 | 1/1994 |
| JP | 4238725 | 8/1992 |
| JP | 09141368 | 6/1997 |
| JP | 11059181 | 3/1999 |
| JP | 11227459 | 8/1999 |

*Primary Examiner*—Kiran B. Patel
(74) *Attorney, Agent, or Firm*—Warner Norcross & Judd

(57) ABSTRACT

A vehicle door beam of relatively small profile and high strength. The door beam is fabricated from a web and includes a beam portion and brackets extending from opposite ends of the beam portion. The beam portion includes two lateral portions of the web rolled inwardly into closed configurations, and the two lateral edges of the lateral portions are welded to the beam portion. In an alternative embodiment, a second web is included in the beam portion and is part of both of the closed configurations.

3 Claims, 9 Drawing Sheets

U.S. PATENT DOCUMENTS

| | | | |
|---|---|---|---|
| 6,428,080 B1 | 8/2002 | Ochoa | 296/146.6 |
| 6,454,884 B1 | 9/2002 | McNulty et al. | |
| 6,508,035 B1 | 1/2003 | Seksaria et al. | 296/146.5 |
| 6,591,576 B1 * | 7/2003 | Iida et al. | 52/731.6 |
| 6,591,577 B2 | 7/2003 | Goto et al. | 296/146.6 |
| 6,592,158 B2 | 7/2003 | Kettler et al. | 293/120 |

* cited by examiner

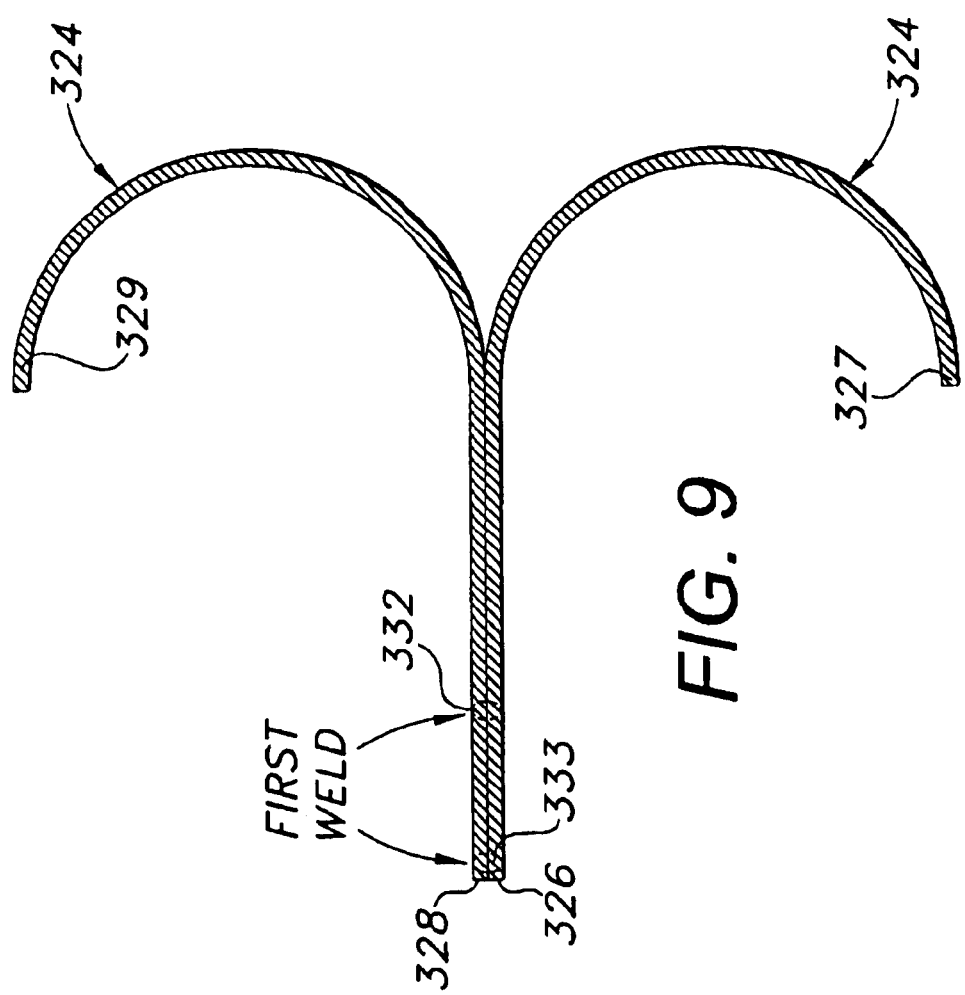

LOW-PROFILE HIGH-STRENGTH VEHICLE DOOR BEAM

This application is a continuation of U.S. patent application Ser. No. 10/402,462, filed on Mar. 28, 2003, (now abandoned).

BACKGROUND OF THE INVENTION

The present invention relates to vehicle door beams and more particularly to one-piece vehicle door beams.

Vehicle door beams are widely used in the automotive industry to enhance the impact strength of vehicle doors and thereby to enhance passenger safety. Door beams can be manufactured as a single piece. Examples of one-piece beams produced by roll forming are illustrated in co-pending U.S. application Ser. No. 09/822,658 filed Mar. 30, 2001 by Nees and U.S. Pat. No. 5,756,167 issued May 26, 1998 to Tamura et al. Examples of one-piece beams produced by stamping or pressing are illustrated in U.S. Pat. No. 5,183,718 issued Sep. 29, 1998 to Masuda et al and Japanese Patent Publication 4-238725 dated Aug. 26, 1992. While these door beams represented advancements in the art, artisans continue to seek door beams of the desired strength, but with smaller profiles, less material, and/or increased ease of manufacture.

SUMMARY OF THE INVENTION

The aforementioned need is met in the present invention in which a door beam provides a relatively low profile and ease of manufacture, while still meeting the strength requirements of government regulations and vehicle manufacturers. More specifically, the door beam includes a web having two lateral portions rolled into and secured in closed configurations.

In various embodiments, the lateral edges of the lateral portions are connected to various other portions of the door beam. In a first embodiment, the lateral edges are welded to a central portion of the web adjacent one another. In a second embodiment, one lateral edge is welded to a central portion of the web, and the other lateral edge is welded to the first lateral portion along a line separate from the one lateral edge. In a third embodiment, an additional web or leg is secured within the beam, and either or both lateral edges are secured to the additional web.

The defined door beam provides improved strength, enabling reduced profiles and/or lengths. Accordingly, the door beam is usable in a wide variety of applications.

In a preferred embodiment, mounting brackets are integrally formed with the door beam. Such mounting brackets are relatively wide, providing additional options for securing the door beam within a vehicle door.

In another preferred embodiment, the door beam is roll formed. As is known in the art, the door beam can be given a "sweep" or curve, providing additional application options.

These and other objects, advantages, and features of the invention will be more fully understood and appreciated by reference to the detailed description of the preferred embodiments and the drawings.

BRIEF DESCRIPTION OF THE DRAWINGS

FIG. 9 is a sectional view similar to FIG. 7 but in a second intermediate step of manufacture.

DETAILED DESCRIPTION OF THE PREFERRED EMBODIMENTS

I. Preferred Embodiment

Figure 1:
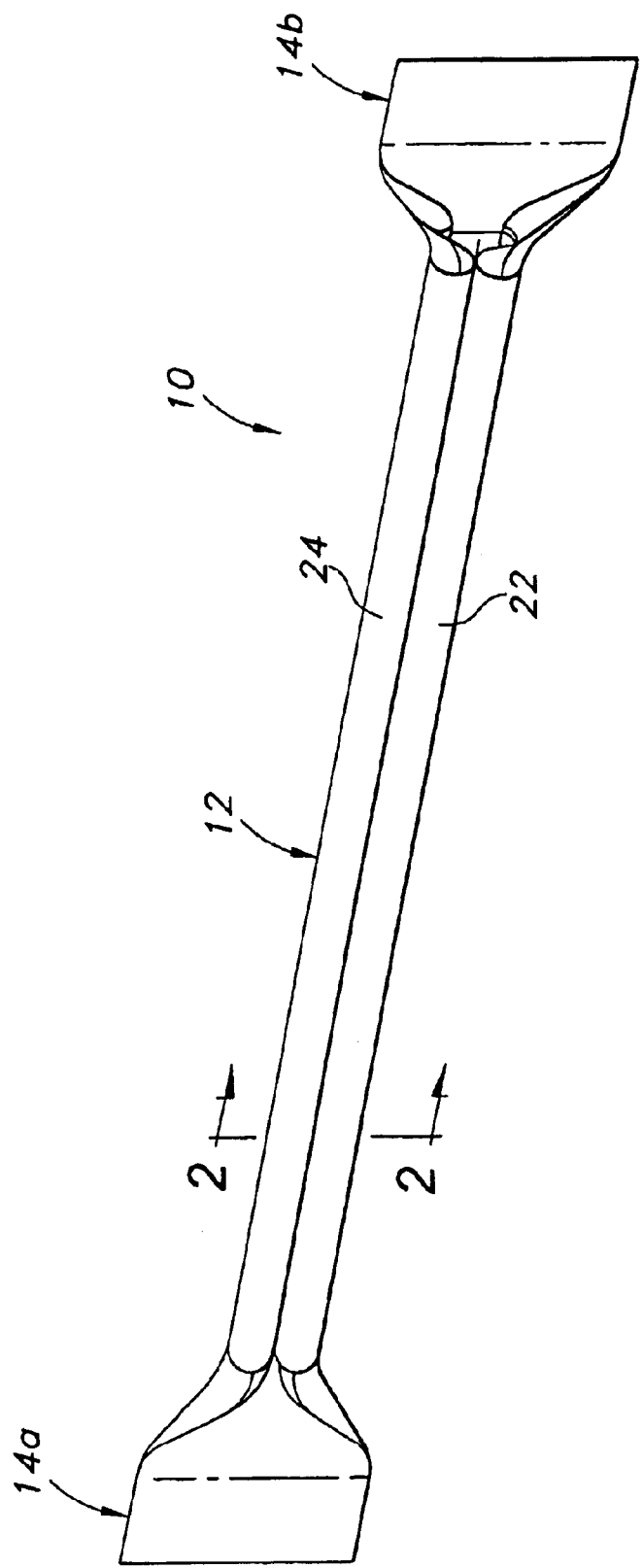
FIG. 1 is a perspective view of the door beam of the present invention.
Figure 2:
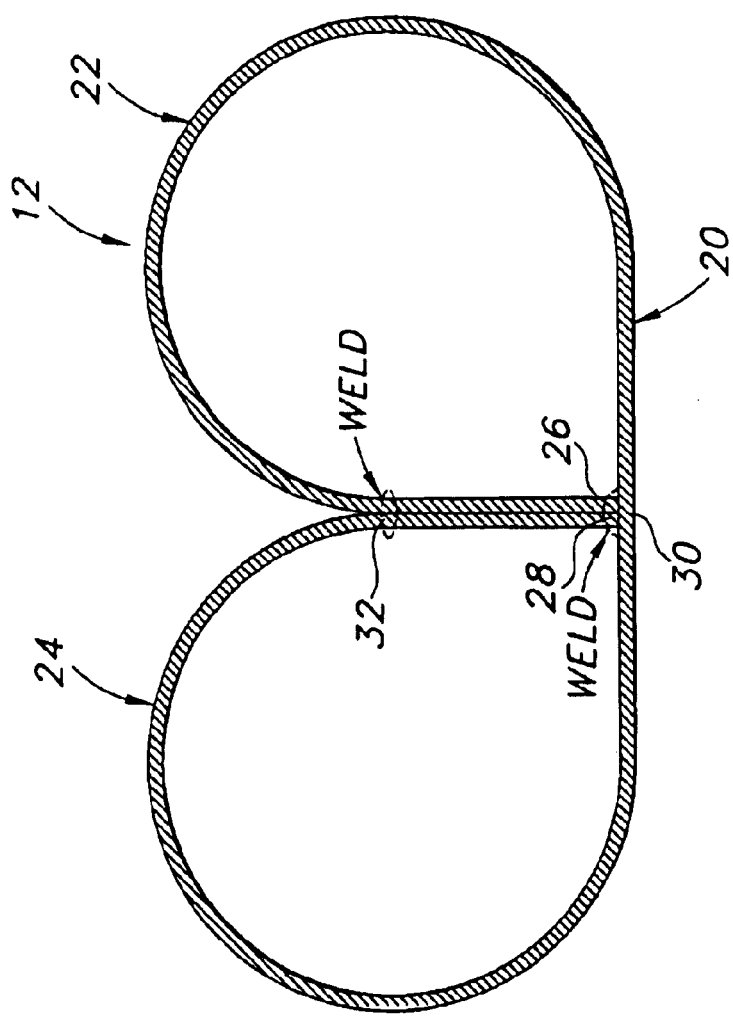
FIG. 2 is a sectional view taken along line II—II in FIG. 1.

A door beam constructed in accordance with a preferred embodiment of the invention is illustrated in FIGS. 1 and 2 and generally designated 10. The door beam includes a beam portion 12 and a pair of brackets 14a and 14b extending from the opposite ends of the beam portion. In the disclosed embodiment, the beam 12 and the brackets 14 are fabricated from a single piece of steel. A wide variety of steels and other suitable materials can be used and will be apparent to those skilled in the art.

The beam portion includes a web 20 which includes a first lateral portion 22 and a second lateral portion 24. The first and second lateral portions include first and second lateral edges 26 and 28, respectively. The first lateral portion 22 forms a closed configuration in which the lateral edge 26 engages a central portion 30 of the web 20, and the second lateral portion 24 forms a closed configuration in which the lateral edge 28 also engages the central portion 30 of the web 20. Both of the lateral edges 26 and 28 are welded or otherwise connected to the central portion 30 of the web 20. As an option, the first and second lateral portions 22 and 24 additionally can be welded together along a line 32 which is separate from the lateral edges 26 and 28. The first and second lateral portions are of similar or generally equal size and result in closed configurations of similar or generally equal size and shape.

The vehicle door beam 10 is fabricated using well-known roll forming techniques. As noted in the Background, the concept of a one-piece vehicle door beam is known in the art, and the specific techniques and steps need not be described in detail.

Figure 3:
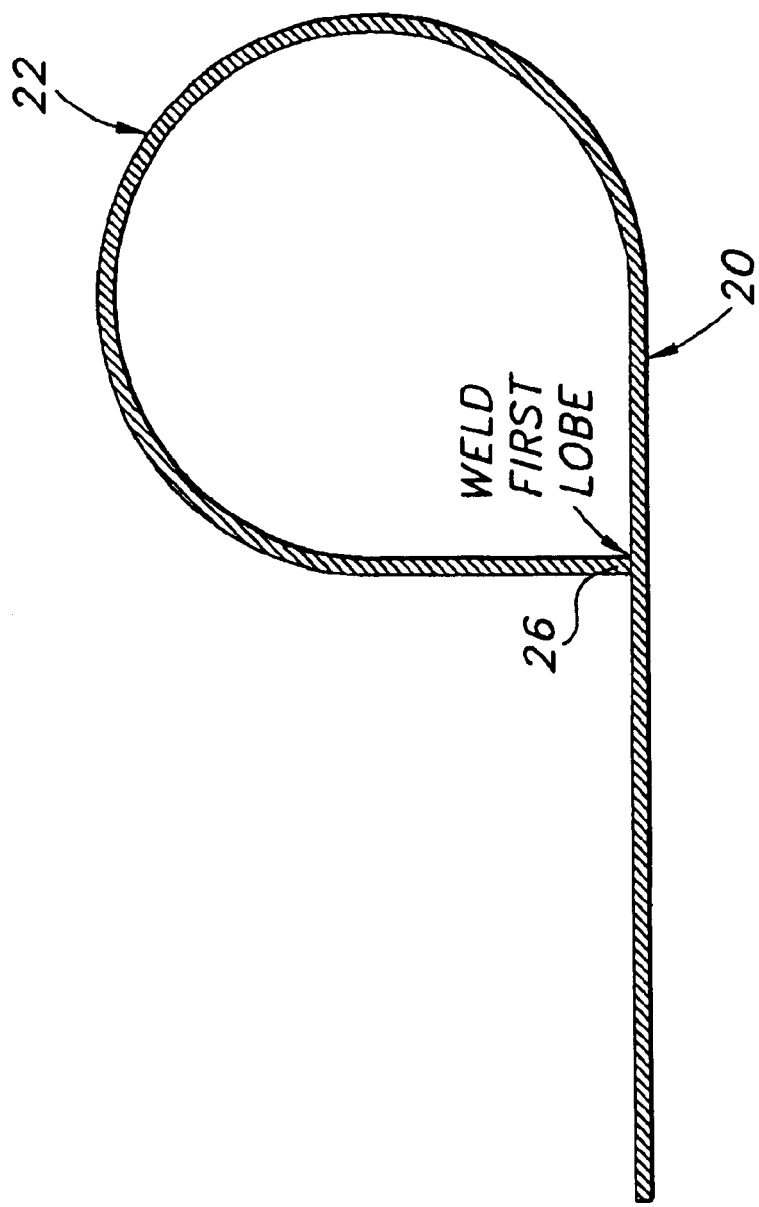
FIG. 3 is a sectional view similar to FIG. 2 but in an intermediate step of manufacture.

As illustrated in FIG. 3, a first step is to roll the first lateral portion 22 upon itself to form a closed configuration in which the lateral edge 26 engages or abuts the web 20. The edge 26 is welded to the web to secure the closed configuration. In a second step, the second lateral portion 24 is rolled into a closed configuration in which the lateral edge 28 also engages or abuts the web 20 in a location adjacent the first lateral edge 26. The second lateral edge 28 is welded in position to provide the cross-sectional shape illustrated in FIG. 2. Optionally, the first and second lateral portions can be welded together along the line 32.

The present specification uses "welding" to describe the connection of the metal-to-metal connections. Of course, other suitable attachment techniques now know or later developed can be readily substituted for welding. And, the particular attachment techniques will depend on a variety of considerations including material and cost. In all of the welding operations of the disclosed embodiments, the weld can be continuous, intermittent (i.e. a stitch weld), or other series of welds along a line.

II. First Alternative Embodiment

Figure 4:
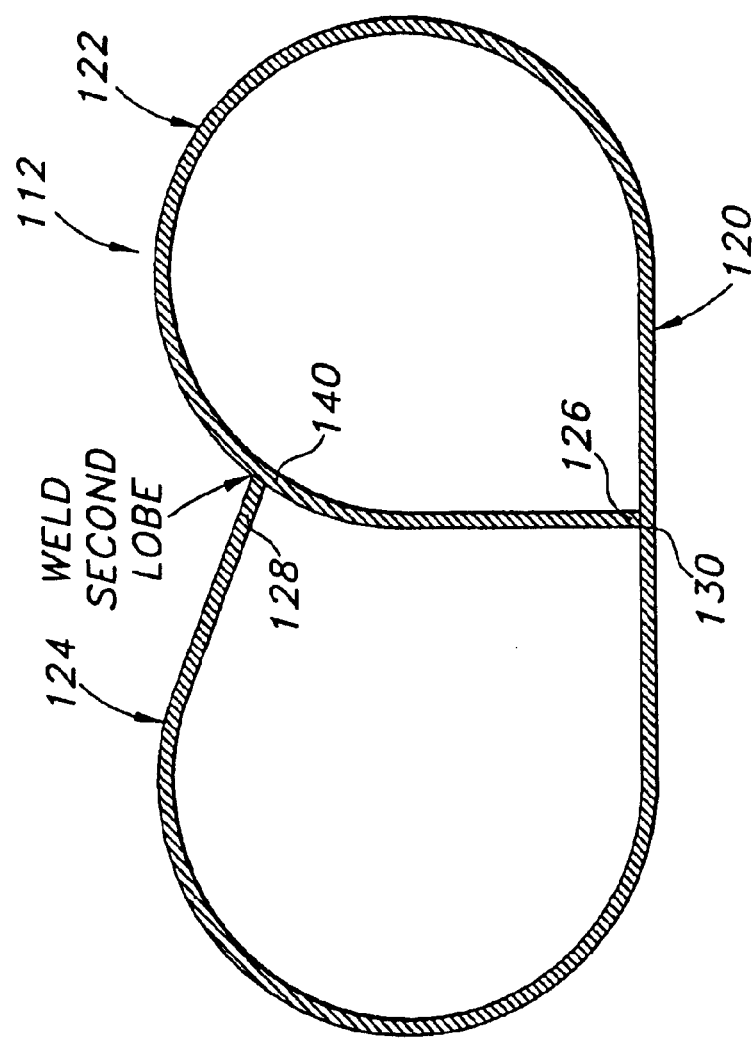
FIG. 4 is a sectional view similar to FIG. 2 showing a first alternative embodiment.

A first alternative embodiment 112 of the vehicle door beam is illustrated in FIG. 4. The beam portion 112 includes a web 120 having a pair of lateral portions 122 and 124. The first lateral portion 122 is generally identical to the first lateral portion 22 described in the preferred embodiment. The second lateral portion 124 is different in that its lateral edge 128 engages or abuts the second lateral portion 122 along a line 140 that is separate from the first lateral edge 126. The second lateral edge 128 is welded in position along line 140.

The manufacturing process to create the beam portion 112 is generally similar to that described above in conjunction with beam portion 12.

III. Second Alternative Embodiment

Figure 5:
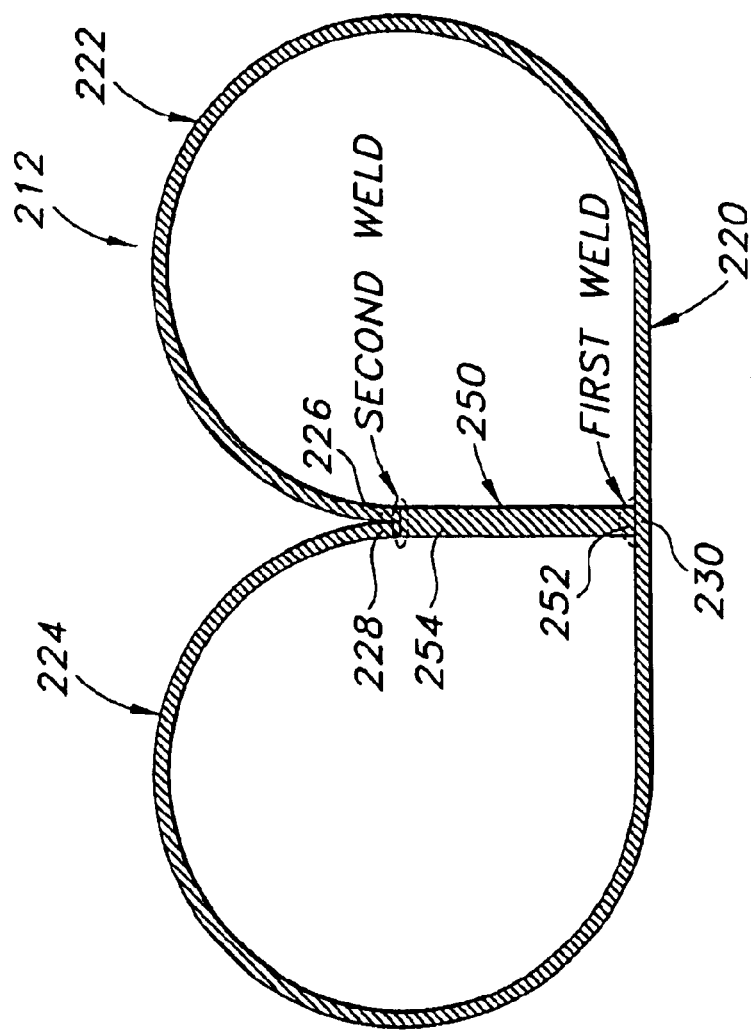
FIG. 5 is a sectional view similar to FIG. 2 showing a second alternative embodiment.

A second alternative embodiment 212 of the beam portion is illustrated in FIG. 5. As with the previous embodiments, the beam portion 212 includes a web 220 having first and second lateral portions 222 and 224. In addition, the beam portion 212 includes an additional web or leg 250 having opposite first and second edges 252 and 254. The first lateral edge 252 is welded to the central portion 230 of the web 220. The first and second lateral edges 226 and 228 are welded to the second edge 254 of the leg 250.

Figure 6:
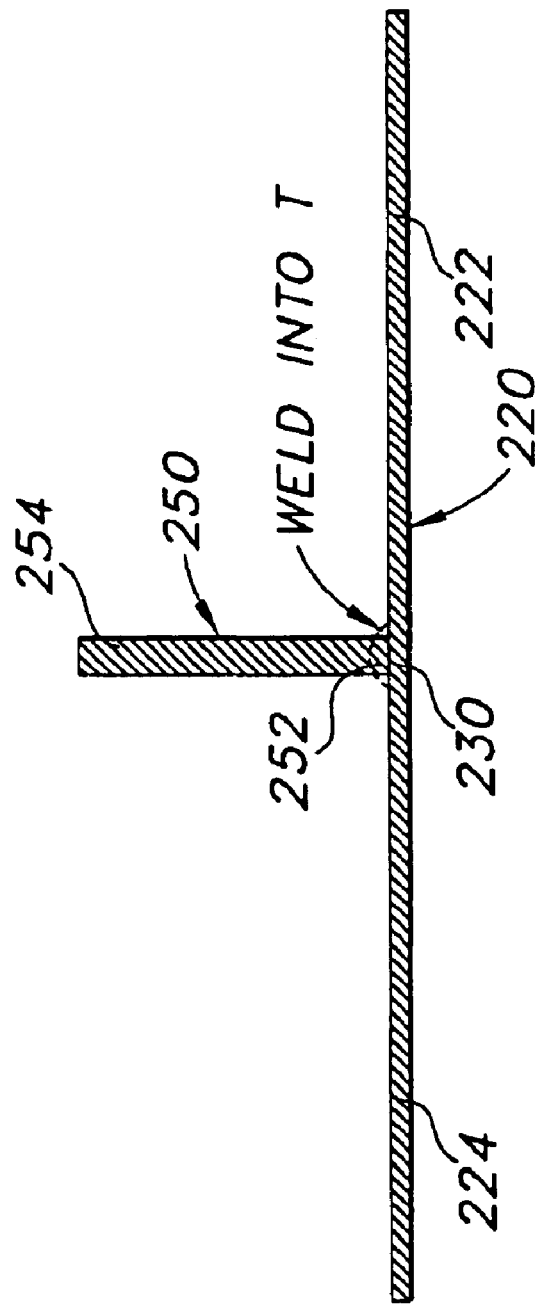
FIG. 6 is a sectional view similar to FIG. 5 but in an intermediate step of manufacture.

Again, the manufacturing techniques used to fabricate the beam 212 are generally similar to those described above. As a specific step illustrated in FIG. 6, the leg 250 is attached to the web 220 at the central location 230. In subsequent manufacturing steps (not illustrated), the first and second lateral portions 222 and 224 are rolled into closed configurations engaging and connected to the second edge 254 of the leg 250 to complete the construction illustrated in FIG. 5.

IV. Third Alternative Embodiment

Figure 7:
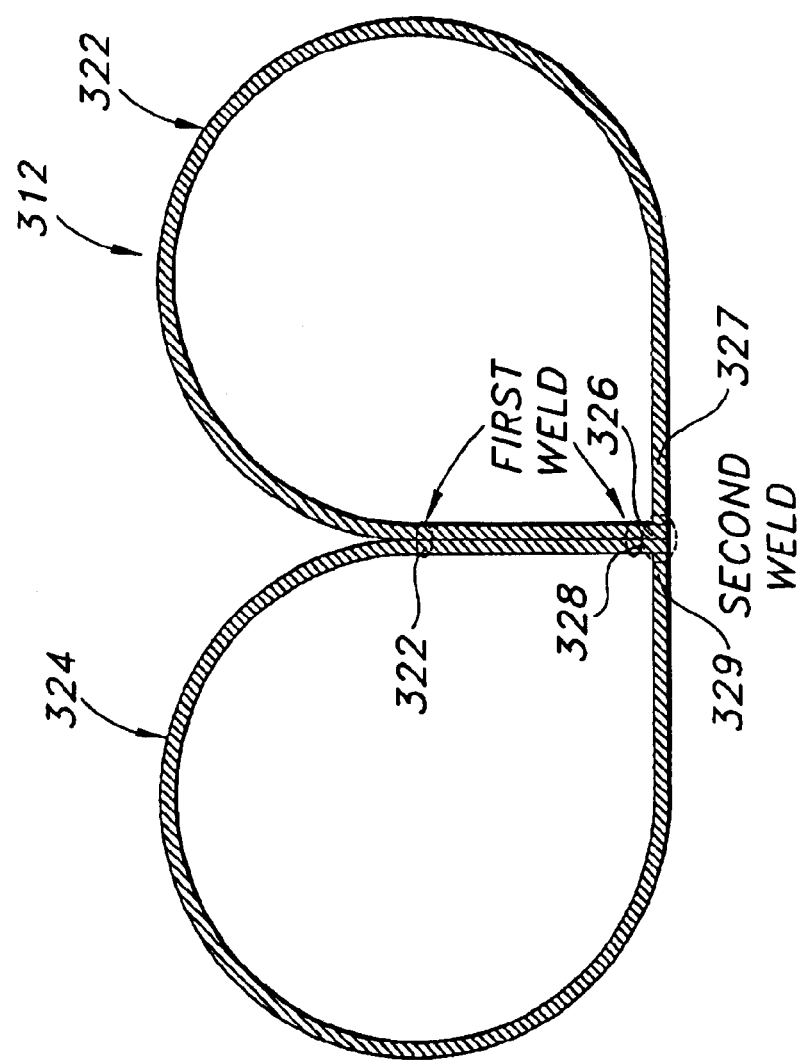
FIG. 7 is a sectional view of a third alternative embodiment.

A third alternative embodiment 312 of the vehicle door beam is illustrated in FIG. 7. The beam portion 312 includes a first lateral portion 322 and a second lateral portion 324. The two lateral portions 322 and 324 are not part of a single web, but rather are separate connected pieces. The first lateral portion 322 is a closed configuration wherein the lateral edge 327 engages and is welded to the lateral edge 326, and the second lateral portion 324 is a closed configuration in which the lateral edge 329 engages and is welded to the lateral edge 328. Additionally, the two lateral portions are welded together along lines 332 and 333.

Figure 8:
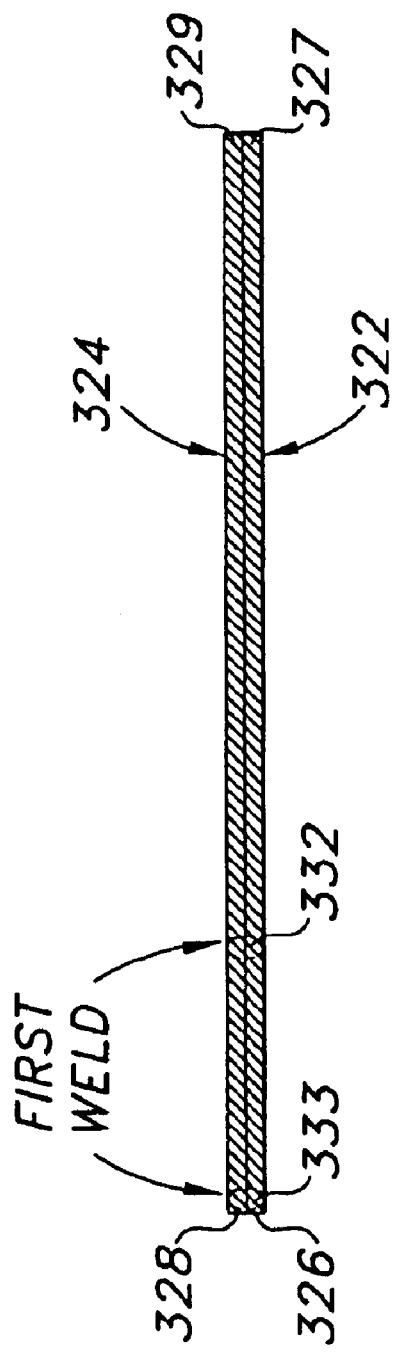
FIG. 8 is a sectional view similar to FIG. 7 but in a first intermediate step of manufacture.

FIGS. 8 and 9 show two intermediate steps in fabricating the beam portion 312 illustrated in FIG. 7. In FIG. 8, the two lateral portions 322 and 324 are pieces of flat stock laid against one another. The two pieces are welded or otherwise connected along lines 332 and 333. FIG. 9 illustrates a subsequent step in which the two lateral portions 322 and 324 are being formed into their closed configurations. Ultimately, the lateral edges 327 and 329 engage lateral edges 326 and 328 respectively and are welded thereto to complete the beam portion 312 illustrated in FIG. 7.

V. Conclusion

In all of the described embodiments, the profile of the beam portion is relatively small, and yet the beam meets or exceeds governmental regulations and vehicle manufacturer requirements. Also, door beams constructed in accordance with the present invention can be longer than those of the prior art. When roll formed, the door beams can be given a "sweep" or curve. Further when roll formed, the mounting brackets are relatively wide, providing increased surface attachment area. All of these advantages enable the present door beam to be used in a variety of applications in which prior art beams cannot be used. Therefore, the present invention enables a wider variety of vehicle door designs.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are difined follows:

1. A one-piece vehicle door beam comprising:

an elongated beam portion having opposite ends, said beam portion including first and second lateral portions, said lateral portions terminating in first and second lateral edges, said first lateral portion shaped so that said first lateral edge abuts said beam portion along a first line, said second lateral portion shaped so that said second lateral edge abuts said first lateral portion along a second line separate from said first line, said first lateral edge welded along its length to said beam portion, said second lateral edge welded alone its length to said first lateral portion; and first and second brackets unitary with and extending from said beam portion, said bracket portions adapted for attachment to a vehicle door.

2. A vehicle door beam comprising:

an elongated beam portion having opposite ends, said beam portion including first and second lateral portions terminating in first and second lateral edges respectively, said first lateral edge abutting said beam portion, said first lateral edge welded to said beam portion along a first line to form a first closed configuration, said second lateral edge abutting said first lateral portion, said second lateral edge welded to said first lateral portion along a second line separate from said first line to form a second closed configuration; and a pair of bracket portions extending from the opposite ends of said elongated beam portion and adapted for attachment to a vehicle door.

3. A vehicle door beam as defined in claim 2 wherein said beam portion and said bracket portions are parts of a single unitary piece.

* * * * *

UNITED STATES PATENT AND TRADEMARK OFFICE
CERTIFICATE OF CORRECTION

PATENT NO. : 6,896,314 B2
DATED : May 24, 2005
INVENTOR(S) : Melvin J. Guiles

It is certified that error appears in the above-identified patent and that said Letters Patent is hereby corrected as shown below:

Column 4,
Line 33, "alone" should be -- along --.

Signed and Sealed this

Twenty-seventh Day of September, 2005

JON W. DUDAS
*Director of the United States Patent and Trademark Office*